United States Patent [19]

Breslau

[11] 4,249,822
[45] Feb. 10, 1981

[54] METHOD AND APPARATUS FOR PRINTING BLACK BORDERS ON PHOTO PRINTS

[75] Inventor: Steven M. Breslau, Cranford, N.J.

[73] Assignee: Pace Photographic Products, Inc., Chicago, Ill.

[21] Appl. No.: 37,838

[22] Filed: May 10, 1979

[51] Int. Cl.³ .............................................. G03B 27/58
[52] U.S. Cl. ......................................... 355/74; 355/77
[58] Field of Search ..................................... 355/72–74, 355/77, 79, 40–43, 75, 76

[56] References Cited

U.S. PATENT DOCUMENTS 3,829,211  8/1974  Mitchell ................................ 355/74
4,108,548  8/1978  Hawkins ................................ 355/74

FOREIGN PATENT DOCUMENTS 516523  1/1940  United Kingdom ...................... 355/74

Primary Examiner—Michael L. Gellner
Assistant Examiner—W. J. Brady
Attorney, Agent, or Firm—Lackenbach, Lilling & Siegel

[57] ABSTRACT

A method and apparatus for photographic printing wherein the margin of a printing paper is masked and the uncovered region inside the margin is exposed by projection or contact printing, after which most of the central exposed region is masked and a remaining uncovered region is exposed to provide a border bounding the central image.

11 Claims, 13 Drawing Figures

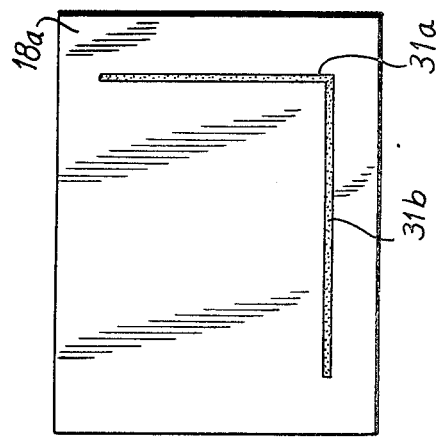
FIG. 11
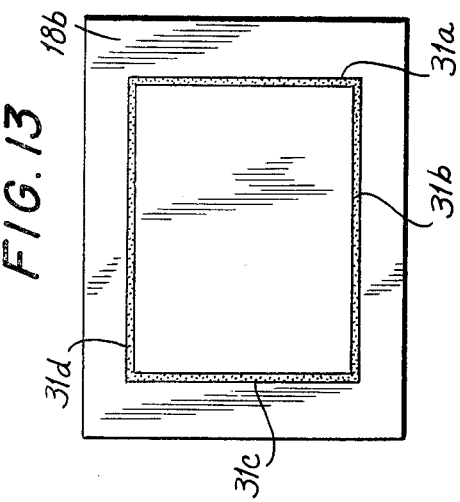
FIG. 13
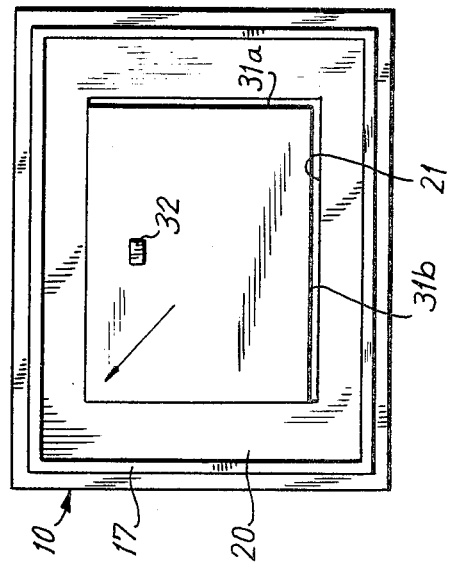
FIG. 10
FIG. 12
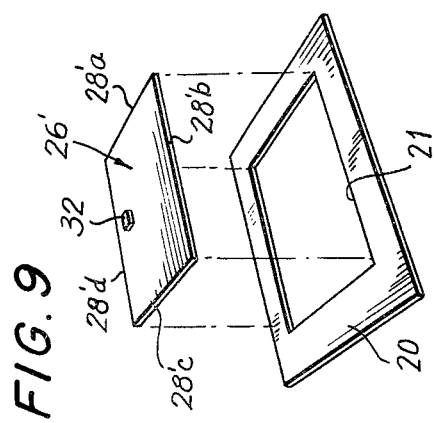
FIG. 9

4,249,822

METHOD AND APPARATUS FOR PRINTING BLACK BORDERS ON PHOTO PRINTS

BACKGROUND OF THE INVENTION

As is well known to those versed in the art, the provision of a black border bounding a photograph has presented many problems and difficult procedures. Primarily, black borders were provided by enlarging the opening in the negative carrier of the enlarger, to thereby expose the area around the image. This presented problems in controlling the border width, and made cropping extremely difficult if possible at all. While the use of an easel with movable framing members made possible the provision of a black border, this procedure was tedius and time consuming.

Applicant's assignee has experimented with and distributed a device since February 1978 for printing borders on photo prints. This device included an outer mask of closed outline configuration made of a magnetic material and had a central opening. The central opening of the device was dimensioned and shaped to expose an initially uncovered region of a light sensitive printing sheet on which the outer mask was placed. An inner mask was provided and receivable within the outer mask opening to cover the central portion of the initially uncovered region and expose a finally uncovered region bounding the initially uncovered region.

However, the device distributed by applicant's assignee had a number of problems which rendered the same unsuitable for the intended use. Firstly, the inner masks, in most cases, were not totally opaque, but had pinholes therein. This resulted in spotting of the image areas during formation of the borders. Also, the corners of a transparent bounding portion provided on the inner mask did not normally match the corners of the outer mask thereby producing gaps or spaces therebetween. This resulted in a shadowing effect along the borders formed by light passing through the transparent bounding portions and directly through the gaps or spaces. Associated with this problem was the additional difficulty of maintaining uniform width transparent bounding portions, this resulting in the formation of undesirable nonuniform borders.

SUMMARY OF THE INVENTION

Accordingly, it is an important object of the present invention to provide improvements in a method and apparatus of photographic printing which overcome the difficulties in the prior art, permitting of precise and uniform width control of the border, as well as enabling cropping to any desired extent. Also, any selected width of border and shape of border may be attained with equal ease by merely employing the proper masking elements.

Another important aspect of the present invention as above suggested is the provision on masking elements of the present invention of magnetic means for close magnetic coupling of the masking elements to a ferrous metal easel or undersurface to facilitate operation without inadvertent or accidental mask movement, and to assure sharp edges because of the close magnetic attraction.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

BRIEF DESCRIPTION OF THE DRAWINGS

FIG. 9 is a perspective view of a further embodiment of the invention, showing an early stage in the practice of said further embodiment;

FIG. 10 is a plan view of the embodiment of FIG. 9, showing an intermediate stage in the use thereof;

FIG. 11 is a plan view showing a photographic print after exposure in a manner shown in FIG. 10 to form a partial border;

FIG. 12 is a plan view of the embodiment of FIG. 9, showing a final state in the use thereof; and FIG. 13 is a plan view similar to FIG. 11 but showing the photographic print after final exposure as shown in FIG. 12 to complete the formation of the border about the entire perimeter of the centrally exposed image.

DESCRIPTION OF THE PREFERRED EMBODIMENT

Figure 1:
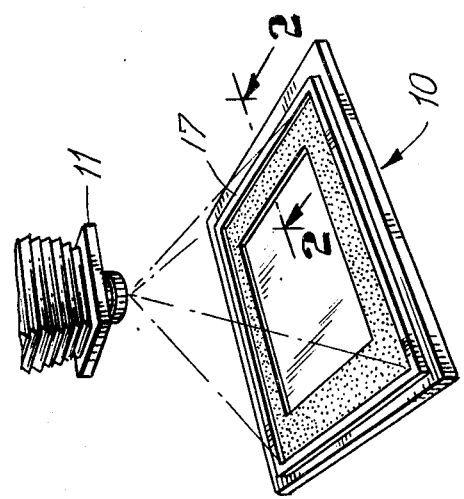
FIG. 1 is a perspective view illustrating an initial stage in the method of the instant invention employing certain apparatus of the invention.

Referring now more particularly to the drawings, and specifically to FIG. 1 thereof, printing apparatus is illustrated therein, being projection printing as in enlarging. However, the present invention may be employed with equally advantageous results in the procedures of contact printing. An easel or board is generally designated 10, and supported in upwardly facing relation directly beneath a projector 11, which may be conventional, including a negative carrier, etc.

Figure 2:
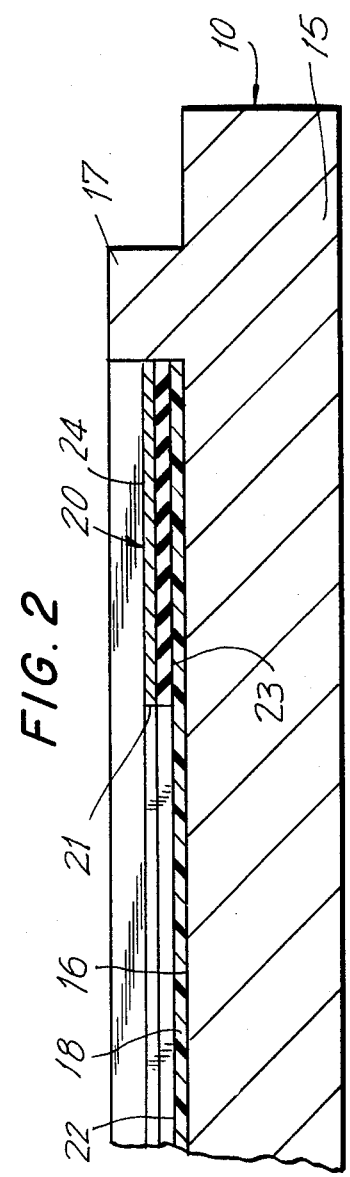
FIG. 2 is a partial sectional view taken generally along the line 2—2 of FIG. 1, enlarged for clarity.

Referring to FIG. 2, the easel is shown as a metal plate 15 having a generally flat upper surface 16, and provided on the upper surface with an upstanding frame or rib 17 of generally rectangular closed outline configuration having a conventional internal dimension for receiving printing paper. Of course, an easel may be provided with adjustable frame members, if desired, but such construction is not essential to the instant invention.

A light sensitive printing sheet 18 is illustrated in position resting on the upper easel surface 16, conformably within the circumferentially extending raised land or frame 17. In addition, a light impervious masking element 20 rests on the circumferential margin of the printing sheet 18, being conformably received within the frame 17 and having a central opening inner edge 21 exposing a central region 22 of the printing sheet to the projector 11.

The outer or margin covering mask 20 may advantageously have its upper surface 24 of a dull, light absorbent or matte finish, while the under surface 23 of the border mask is advantageously impregnated with magnetized filings or other suitable magnetic material for magnetic attraction to the metal upper surface 16 of the easel 10. By this magnetic attraction, the inner edge 21 of the border mask 20 is held closely against the surface of printing paper 18, so as to define a sharp edge on the latter resulting from light exposure.

Figure 3:
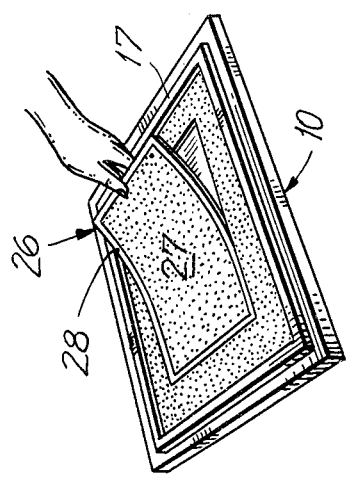
FIG. 3 is a perspective view showing an intermediate stage in practice of the instant method, utilizing the instant apparatus.

With the border mask 20 in position, as shown in FIGS. 1 and 3, the initially uncovered central region 22 of paper 18 is exposed, as by projected light from the projector 11 passing through a negative or other transparency.

Figure 5:
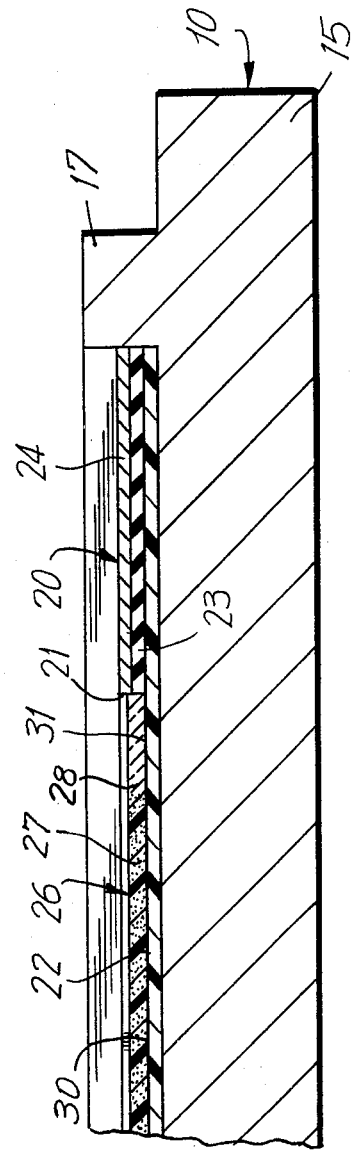
FIG. 5 is an enlarged, partial sectional elevational view taken generally along the line 5—5 of FIG. 4.

Subsequent to this initial exposure, there is placed over the initially exposed region 22, within the opening 21 of the border mask 20, an additional, inner mask 26. The additional or inner mask 26 is sized for snug conforming engagement within the opening 21 of the outer mask 20, so that its positioning is automatically properly effected and gaps or spaces between the inner and outer masks 26, 20 are minimized or avoided. The central region 27 of the mask 26 must must be opaque over the entire surface thereof, and may have a dull, absorbent or matte upper surface, while the bounding edge margin 28 of the inner mask 26 is of uniform width transparent or light permeable material, such as transparent plastic. If the central region 27 is not opaque over its entire surface, but has, for example, pinholes or other light transmissive portions therein, this will result in spotting or the like of the image region 30 during formation of the border 31', as will be more fully described below. This construction may best be seen in FIG. 5, wherein it will readily be apparent that the central region 30 of the initially exposed region 22 is now covered or masked to leave a uniform width unmasked, light accessible or finally exposed region 31 surrounding the centrally masked region 30. That is, the uniform width finally exposed or unmasked region 31 extends conformably about the margin of interior opening 21 of the outer mask 20, and circumferentially about the central opaque region 27 of inner mask 26.

Figure 4:
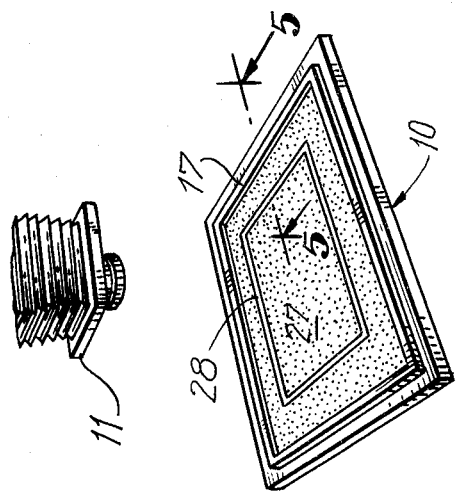
FIG. 4 is a perspective view showing a later stage in practice of the instant invention.

Thus, with the inner mask 26 in position as shown in FIG. 4, additional exposure is made by projection of light from projector 11 which passes only through the uniform width light permeable bounding edge margin 28 of inner masking element 26 to impinge on the finally exposed printing sheet region 31 and define thereon, after developing, a black border of uniform width bounding the central image. Advantageously, the additional exposure, which may last for several seconds, is with the negative carrier removed from the enlarger or from any light source.

Figure 6:
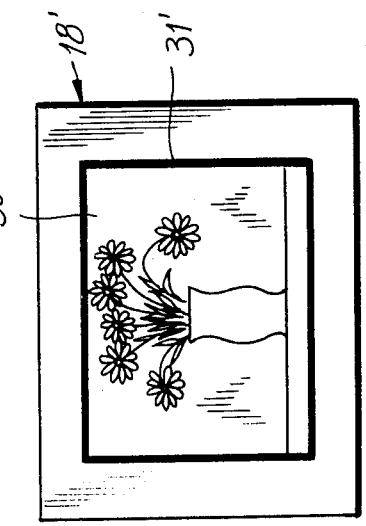
FIG. 6 is a plan view showing a photographic print produced in accordance with the teachings of the present invention.

A finished photograph is shown at 18' in FIG. 6, wherein a central image 30' is located within a circumferential black border 31'.

Figure 7:
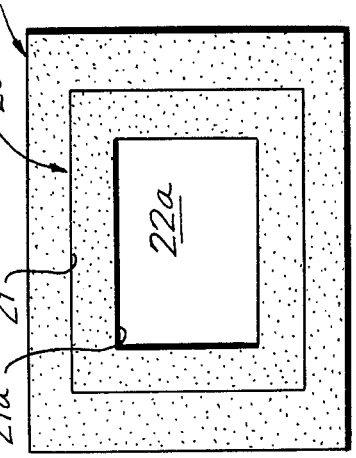
FIG. 7 is an illustration showing a modification wherein additional cropping is utilized.
Figure 8:
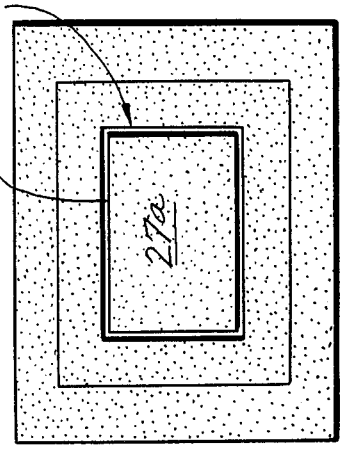
FIG. 8 is a plan view showing a later stage in practicing the embodiment of FIG. 7.

Should it be desired to crop the image 30', such cropping may be effected by the slightly modified embodiment shown in FIGS. 7 and 8. It will there be seen that an outer mask 20 may be employed, as in the first described embodiment. However, an intermediate mask 20a of generally polygonal outline configuration may be conformably engaged within the opening 21 of mask 20, the polygonal intermediate mask 20a having an inner central through opening 21a serving to crop the image to a desired smaller size. After exposure of the initially exposed printing sheet portion 22a within the opening 21a, an inner mask 26a is placed on the initially exposed region 22a conformably within the opening 21a of intermediate mask 20a. The inner mask 26a comprises a central opaque region 27a and a uniform width circumferential or marginal edge portion 28a of light permeable character, all generally similar to but smaller than the first described inner mask 26.

With the inner mask 26a in the position illustrated in FIG. 8, there is finally exposed the printing paper region beneath the light permeable margin 28a, to define thereof, after developing, a black border bounding a cropped image.

If desired, say in reversal printing from slides, the apparatus of the present invention may be employed to produce a fine white border and a large black mat area around the border. Also, in printing from negatives, a black border may be eliminated and a wide, solid white margin may be produced, as may be desired when the picture is dark and a thin black border would be essentially lost or difficult to identify.

Conversely, by mere removal of the outer mask 20 on final exposure, there may be provided a wide black mat around the picture. Hence, it is seen that the apparatus of the present invention is capable of much versatiligy in use.

Referring now to FIG. 9, a further embodiment of the invention is illustrated which is simpler and less costly to manufacture and equally effective as the embodiments shown in FIGS. 1-8. Here, the outer or margin covering mask 20 may be the same as described before. However, instead of using an inner mask 26 which includes a central opaque region 27 and a transparent or light permeable bounding edge margin 28, an inner mask 26' is provided which has the same configuration as the opening 21 of the outer mask, but is smaller in each of its dimensions by the width of the desired border to be formed on the exposed print. The inner mask 26' can be formed by die cutting the same from a large black or opaque vinyl sheet. Since the inner mask or insert 26' is simply in the nature of a single sheet, and does not require provision about the periphery thereof of a transparent region as required by the embodiments shown in the previously described figures, the insert 26' can be made very simply and inexpensively. Of equal importance is that the tolerances in die cutting an insert such as the inner mask 26' can be substantially greater than the tolerances obtainable in printing an opaque or substantially opaque central region 27 on a transparent insert 26 in order to provide a uniform width transparent bounding margin 28. As will become evident from the discussion that follows, the embodiment of FIG. 9 not only reduces the cost of manufacture, but avoids the effect of shadowing which results when the transparent border or region 28 does not fully conform to the inner edge 21 of the outer mask to thereby produce spaces or gaps therebetween. Additionally, because the width of the resulting borders achievable with the device of FIG. 9 is more dependent on a die cutting operation as opposed to a printing operation, the tolerances for the width of the resulting border can be controlled much more closely and the borders obtainable are much more uniform and commercially acceptable.

In the use of the embodiment of FIG. 9, the outer magnetic mask 20 is placed over a sheet of photosensitive or photographic paper as described previously. After the picture is properly composed, the image may be printed normally through the center opening defined by the margin 21 of the mask 20.

Leaving the mask 20 and photographic paper in place, the opaque vinyl insert 26' is inserted in the center of the outer mask 20, over the exposed portion of the print. A foam rubber button or pad 32 may be provided which is advantageously disposed as shown in FIG. 10 to be near the top of the insert 26'.

During an intermediate step of the operation, referring to FIG. 10, the insert 26' is slipped over the printing paper into the upper left hand corner as shown. The foam button 32 facilitates such movement. At this point, the negative carrier is removed from the enlarger and the finally exposed or unmasked region 31a and 31b are exposed to white light. The regions 31a and 31b are defined by the inner edge 21 and the right and bottom margins 28'a and 28'b of the inner mask 26'. As will be evident from FIG. 11, exposure of the photosensitive or printing paper with the insert as shown in FIG. 10, will produce the narrow border of the print at the right and bottom sides of the image.

Referring to FIG. 12, the insert is subsequently moved by sliding the same to the lower right hand corner to space the insert edges 28'c and 28'd from the margin 21, thereby exposing the left and top narrow borders 31c and 31d to white light when the enlarger is again turned on. Following the two exposures, the printing paper may be processed normally. The result is a sharp, clean black border around the print or photographed image.

As with the embodiments described previously in connection with FIGS. 1-8, the embodiment of FIG. 9 may produce many variations on border treatments. If printing is from slides (reversal printing), for example, use of the embodiment of FIG. 9 will produce a fine white border and a large black matte area around it. Additionally, if the black vinyl insert 26' is not used in the mask 20 and the mask 26' is not inserted as described above, the black border is eliminated and a wide, solid white matte is left. This is especially effective when the picture is dark and a thin black border is essentially lost. By way of further example, if following initial exposure of the central region, a solid insert having dimensions equal to those of the inner edge 21 is placed in the center of the outer mask 20, and the outer mask is removed, upon exposure to the white enlarger light, a solid black matte results around the picture.

If printing is in color, and the light for exposure is little or very slight, it is simple to slip the insert 26' by feel, particularly by manipulating the foam rubber button 32.

From the foregoing, it will be appreciated that the present method and apparatus are extremely simple, productive of highly desirable aesthetic results and otherwise fully accomplish the intended objects.

Although the present invention has been described in some detail by way of illustration and example for purposes of clarity of understanding, it is understood that certain changes and modifications may be made within the spirit of the invention.

For example, while the presently preferred modes of the invention shown and described in this application all use rectangular inserts and mating rectangular cut-outs in the outer mask, it should be evident that these shapes can take any form, such as ovals, circles, squares, hearts, etc.

What is claimed is:

1. In the method of photographic printing, the steps which comprise covering a margin of a light sensitive printing sheet to leave an initial uncovered printing sheet region; exposing the initially uncovered light sensitive printing sheet region through a transparency to impart an image to the initially uncovered printing sheet region; covering the central portion of the initially uncovered printing sheet region by positioning an opaque second mask which is generally conforming in shape to said initial uncovered printing sheet region and slightly undersized with relation thereto to permit selective movement of said second mask between a plurality of positions in the plane of said first mask to leave a uniform width finally uncovered printing sheet region in each of said plurality of positions, and moving said second mask to each of said plurality of positions to define a uniform finally uncovered printing sheet region which totally bounds said initially uncovered printing sheet region; and additionally exposing said uniform finally uncovered printing sheet regions to impart a uniform border bounding said image.

2. The method according to claim 1, further characterized in that only the initial exposure is through the transparency.

3. The method as defined in claim 1, wherein said initially uncovered printing sheet region defined by said first mask is rectangular in shape, said second mask having a conforming rectangular shape and dimensioned to leave uniform finally uncovered printing sheet regions along two adjacent edges of said second mask when the remaining two adjacent edges abut against associated edges of said first mask, said moving step comprising moving said second mask to a first position wherein two first adjacent edges thereof abut against said first mask to leave finally uncovered printing sheet regions between two second adjacent edges and said first mask, and moving said second mask to a second position wherein said two second adjacent edges thereof abut against said first mask to leave finally uncovered printing sheet regions between said two first adjacent edges and said first mask.

4. The method according to claim 1, further characterized by the step of uncovering the initially covered margin of the printed sheet subsequent to initial exposure to thereby include the margin in the finally uncovered region.

5. Apparatus for imparting a uniform border bounding an image, said apparatus comprising an outer mask of closed outline configuration having a central opening for location in covering relation with the margin of a light sensitive printing sheet to expose the initially uncovered region thereof, and an opaque inner mask generally conforming in shape to said central opening and having smaller dimensions in relation thereto to permit selective movement of said second mask between a plurality of positions in the plane of said first mask and within said central opening to leave uniform width portions of a finally uncovered printing sheet region in each of said plurality of positions, whereby movement of said second mask to each of said plurality of positions results in said uniform finally uncovered printing sheet region which totally bounds said initially uncovered printing sheet region.

6. Apparatus according to claim 5, said outer mask being generally polygonal.

7. Apparatus according to claim 5, said outer and inner masks being magnetic for attraction to a ferrous easel.

8. Apparatus according to claim 5, said outer and inner masks each having a light absorbent surface on one side.

9. Apparatus according to claim 5, wherein said central opening and said second mask have conforming rectangular shapes, said second mask being dimensioned smaller along each of its two orthogonal sides by the desired width of said uniform finally uncovered printing sheet region, whereby movement of said second mask to a first position wherein two first adjacent edges thereof abut againt said first mask leaves finally uncovered printing sheet regions between two second adjacent edges and said first mask, and movement of said second mask to a second position wherein two second adjacent edges thereof abut against said first mask leaves finally uncovered printing sheet regions between said two first adjacent edges and said first mask.

10. Apparatus according to claim 5, further comprising tactile means for facilitating movement of said second mask in little and total absence of light.

11. Apparatus according to claim 10, wherein said tactile means comprises a button attached to an upper or exposed surface of said second mask.

* * * * *